United States Patent
Aronov et al.

(10) Patent No.: US 8,443,292 B2
(45) Date of Patent: May 14, 2013

(54) SCRIPTING APPLICATION WITH PRIVACY MODE COORDINATION

(75) Inventors: Svetlana Aronov, Rehovot (IL); Sagi Monza, Rishon-Lezion (IL); Meidan Zemer, Hod-Hasharon (IL); Oren Gavriel, Petach Tikva (IL); Amir Kessner, Ramat-Gan (IL); Eyal Kobrigo, Yahud (IL); Michal Barak, Kiryat Ono (IL); Dror Schwartz, Holon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 335 days.

(21) Appl. No.: 12/814,364

(22) Filed: Jun. 11, 2010

(65) Prior Publication Data

US 2011/0307799 A1 Dec. 15, 2011

(51) Int. Cl.
*G06F 13/00* (2006.01)
*G06F 14/00* (2006.01)

(52) U.S. Cl.
USPC .......................................... 715/763; 715/765

(58) Field of Classification Search .......... 715/763–765, 715/740–743, 851–853
See application file for complete search history.

(56) References Cited

U.S. PATENT DOCUMENTS

| | | | |
|---|---|---|---|
| 2009/0193410 A1 | 7/2009 | Arthursson et al. | |
| 2009/0196516 A1* | 8/2009 | Perlman et al. | 382/239 |
| 2010/0318507 A1* | 12/2010 | Grant et al. | 707/706 |

* cited by examiner

*Primary Examiner* — Cao "Kevin" Nguyen

(57) ABSTRACT

In at least some embodiments, a computer system includes a processor and a computer-readable storage medium coupled to the processor and storing a scripting application. The scripting application, when executed, is configured to coordinate use of a browser engine privacy mode with emulation of user operations on a browser-hosted application.

20 Claims, 3 Drawing Sheets

SCRIPTING APPLICATION WITH PRIVACY MODE COORDINATION

BACKGROUND

Application programs, including web-based applications such as web pages, and the hardware associated with the applications, are often tested under extreme use conditions. Such conditions may be provided by a system that simulates a number of users simultaneously executing the application. A user may be simulated by execution of a program (e.g., a previously acquired script that provides appropriate user inputs and responses to exercise the application).

BRIEF DESCRIPTION OF THE DRAWINGS

For a detailed description of exemplary embodiments of the invention, reference will now be made to the accompanying drawings in which.

NOTATION AND NOMENCLATURE

Figure 1:
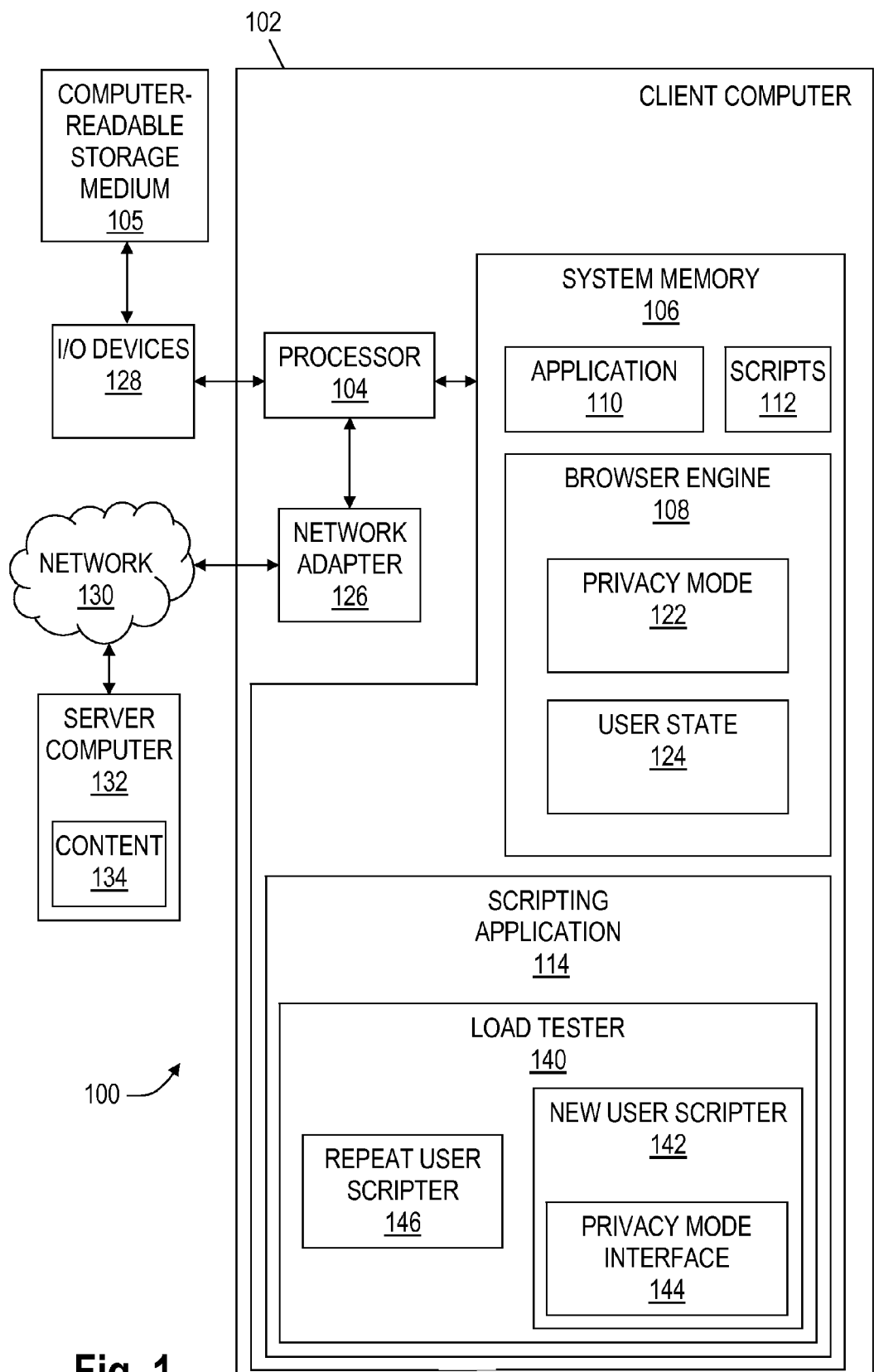
FIG. 1 shows a block diagram for a system in accordance with an embodiment of the disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Applications based on the World Wide Web (i.e., web applications) have increased in functionality and complexity to the extent that they now resemble desktop or thick-client applications. A web page's document object model ("DOM") can be dynamically changed using Asynchronous JavaScript and XML ("AJAX") calls. Many more elements are presented on the display of a modern web application than were presented in the past, and interaction between client and server is not always predictable. New AJAX frameworks, each having a different DOM and Javascript implementation and serving as a basis for web applications, are introduced on a regular basis. Thus, the changing web application development and execution environment makes recording and replaying scripts intended to automate operation of such applications increasingly difficult. There is a tradeoff between DOM accuracy and high performance due to the fact that layout rendering, which is required for DOM accuracy, is a CPU-intensive task. Therefore, accomplishing an accurate layout rendering while preserving high-performance is a major challenge for load testing operations.

Load-testing scripts emulate real-user activity. For example, the emulation may represent a single user's interaction with a browser hosted application as an initialization (e.g., a login), performance of various activities and/or business processes, and then a termination (e.g., a logout). In some instances, each script iteration emulates an entirely new, independent user performing activities (including initialization and termination). In the latter case, no iteration of the script execution should retain any "residues" for the next iteration. In other words, each iteration of a new user should start as if from scratch.

When a browser engine (e.g., Gecko of Firefox) is used for running a load testing script, the browser engine usually manages various resources, such as cookies, cache and history, that are retained from one iteration to another. Such management of resources conflicts with emulating a new user (from scratch) upon each iteration. Disclosed herein are load-testing scripting techniques that use the "privacy mode" feature of a browser engine to perform each new user iteration. As used herein, a "privacy mode" refers to a browser engine feature that allows a user to browse the Internet without storing data related to the browsing session.

In order for every script iteration to be executed as if by a new virtual user, the user state data is reset to an initial state on each new iteration. The user state data may contain: cache, cookies, local/global/session storage data, open connections, etc. The task of resetting user state data may be complicated as such data is sometimes distributed over several components. The privacy mode feature being provided with some mainstream browsers is able to track new web data (e.g., cache, cookies and so on) tied to a user. By definition, a privacy mode feature releases any tracked data when the privacy mode feature is stopped. Thus, starting the privacy mode feature at the beginning of each iteration guarantees that all the data retrieved during this iteration is tracked by privacy mode mechanisms and is released once the privacy mode feature is exited at the end of the iteration. Given that the first iteration starts with a blank user state, there is assurance that whenever the privacy mode is exited, the application will revert to the initial blank user state. Thus, entering privacy mode at the beginning of each iteration, and leaving at the end of each iteration enables effective new user simulation for load test scripting.

Further, using the same browser engine for recording and replay of a script ensures a correct emulation of DOM behavior during a load test operation. Also, by taking into account that the browser engine is embedded, more performance could be gained. In other words, embedding a real browser engine enables accurate emulation of DOM representation and manipulation, while maintaining flexibility to reach higher performance for load testing scalability. Further, by delegation of javascript handling during a load test operation with the browser hosted application, correctness of DOM manipulation with respect to the browser can be guaranteed.

FIG. 1 shows a block diagram for a system 100 in accordance with embodiments of the disclosure. As shown, the system 100 comprises a client computer 102 with a processor 104 (or processors) coupled to system memory 106. Some embodiments of the client computer 102 also include a network adapter 126 and I/O devices 128 coupled to the processor 104. The client computer 102 is representative of a desktop computer, a server computer, a notebook computer, a handheld computer, or a smart phone, etc., in communication with a server computer 132 via a network 130.

The processor 104 is configured to execute instructions read from the system memory 106. The processor 104 may be, for example, a general-purpose processor, a digital signal processor, a microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The system memory 106 corresponds to random access memory (RAM), which stores programs and/or data structures during runtime of the client computer 102. For example, during runtime of the client computer 102, the system memory 106 may store application 110, script 112, browser engine 108, and scripting application 114, which are loaded into the system memory 106 for execution by the processor 104.

The system 100 also may comprise a computer-readable storage medium 105, which corresponds to any combination of non-volatile memories such as semiconductor memory (e.g., flash memory), magnetic storage (e.g., a hard drive, tape drive, etc.), optical storage (e.g., compact disc or digital versatile disc), etc. The computer-readable storage medium 105 couples to I/O devices 128 in communication with the processor 104 for transferring data/code from the computer-readable storage medium 105 to the client computer 102. In some embodiments, the computer-readable storage medium 105 is locally coupled to I/O devices 128 that comprise one or more interfaces (e.g., drives, ports, etc.) to enable data to be transferred from the computer-readable storage medium 105 to the client computer 102. Alternatively, the computer-readable storage medium 105 is part of a remote system (e.g., a server) from which data/code may be downloaded to the client computer 102 via the I/O devices 128. In such case, the I/O devices 128 may comprise networking components (e.g., network adapter 126). Regardless of whether the computer-readable storage medium 105 is local or remote to the client computer 102, the code and/or data structures stored in the computer-readable storage medium 105 are loaded into system memory 106 for execution by the processor 104. For example, the scripting application 114 or other software/data structures in the system memory 106 of FIG. 1 may have been retrieved from computer-readable storage medium 105.

The I/O devices 128 also may comprise various devices employed by a user to interact with the processor 104 based on programming executed thereby. Exemplary I/O devices 128 include video display devices, such as liquid crystal, cathode ray, plasma, organic light emitting diode, vacuum fluorescent, electroluminescent, electronic paper or other appropriate display panels for providing information to the user. Such devices may be coupled to the processor 104 via a graphics adapter. Keyboards, touchscreens, and pointing devices (e.g., a mouse, trackball, light pen, etc.) are examples of devices includable in the I/O devices 128 for providing user input to the processor 104 and may be coupled to the processor 104 by various wired or wireless communications subsystems, such as Universal Serial Bus (USB) or Bluetooth interfaces.

A network adapter 126 may couple to the processor 104 to allow the processor 104 to communicate with a server computer 132 via the network 130. For example, the network adapter 126 may enable the client computer 102 to acquire content 134 (e.g., web pages, applications, images, audio, etc.) from the server computer 132. The network adapter 126 may allow connection to a wired or wireless network, for example, in accordance with protocols such as IEEE 802.11, IEEE 802.3, Ethernet, cellular technologies, etc. The network 130 may comprise any available computer networking arrangement, for example, a local area network ("LAN"), a wide area network ("WAN"), a metropolitan area network ("MAN"), the internet, etc. Further, the network 130 may comprise any of a variety of networking technologies, for example, wired, wireless, or optical techniques may be employed. Accordingly, the server computer 132 is not restricted to any particular location or proximity to the client computer 102.

Referring again to the system memory 106, various data and program modules stored therein for execution will now be described in greater detail. The application 110 may be, for example a web page, web application, or other application to be automated. The application 110 may comprise a portion of the content 134 provided by the server computer 132. In some embodiments, the application 110 represents a portion of an application retrieved from the server computer 132 wherein different portions of the application 110 are executed by the processor 104 and a different processor (not shown) of the server computer 132. The application 110 may include executable programming and various user interface (UI) objects (e.g., links, buttons, widgets, etc). In accordance with at least some embodiments, the application 110 is hosted by the browser engine 108, which is executed by the processor 104.

The scripting application 114, when executed by the processor 104, monitors user generated and/or other events affecting the application 110. The scripting application 114 analyzes the detected events and effects on the application 110 ensuing from the detected events, and records various results of the analyses as steps in one or more scripts 112. The scripts 112 may additionally or alternatively represented previously prepared scripts that are made available to the scripting application 114. In some embodiments, the scripts 112 include a set of dynamic shared object containers, the data structures of which can be configured to form a DOM-like document.

As previously mentioned, there is a tradeoff between DOM accuracy and high performance, due to the fact that layout rendering, which is required for DOM accuracy, is a CPU-intensive task. Therefore, accomplishing an accurate layout rendering while preserving high-performance is a major challenge for load testing applications. In at least some embodiments, the scripting application 114 comprises a load tester 140 that enables load-testing scripts (e.g., scripts 112) to be executed. The load-testing scripts emulate user interaction with the application 110 (e.g., with application objects) to test the performance of the server computer 132 or other components of the system 100. As shown, the load tester 140 may comprise a new user scripter 142 and a previous user scripter 146 to perform load-testing scripts.

When executed, both the new user scripter 142 and the repeat user scripter 146 enable execution of a load-testing script that emulates a single user interacting with the application 110 by completing steps such as initialization (e.g., a login), iterating through performing various workplace, business, or transaction processes, and then termination (e.g., a logout). For the new user operations, no iteration of the script execution should retain any residues (e.g., user state 124 residues) for the next iteration. As previously mentioned, each iteration of a new user should start as if from scratch.

Accordingly, in at least some embodiments, the new user scripter 142 comprises a privacy mode interface 144. The privacy mode interface 144 enables the new user scripter 142 to coordinate use of the privacy mode 122 of the browser engine 108 (i.e., when to start/exit the privacy mode 122) for execution of a new user script. For example, new user scripter 142 may start the privacy mode 122 before other operations of a new user script and exit the privacy mode 122 upon completion of a new user script. Alternatively, the new user scripter 142 may start the privacy mode 122 for certain operations of a new user script and exit the privacy mode 122 after those certain operations are completed. The repeat user scripter 146 does not call on the privacy mode 122 and enables testing of repeat user scripts, in which residues (e.g., user state 124 residues) are retained for the next iteration.

To summarize, in at least some embodiments, a scripting application (e.g., scripting application 114) as disclosed herein is configured to emulate user operations on a browser hosted application (e.g., application 110) using a privacy mode feature (e.g., privacy mode 122) of a browser engine (e.g., browser engine 108). More specifically, the disclosed scripting application may implement a load testing function that times entry and exit of the privacy mode feature of a browser engine with emulation of user operations on a browser hosted application. In at least some embodiments, each load testing function is mapped to a different browser hosted application and each load testing function emulates user operations using the privacy mode feature. Although one new user iteration is possible, the disclosed scripting application is also able to emulate a plurality of new user iterations on the browser hosted application using the privacy mode feature. Each new user iteration may comprise, for example, an initialization phase, an activity phase, and a termination phase. Although other implementations are possible, the disclosed scripting application may start the privacy mode at the beginning of the initialization phase for each new user iteration and exit the privacy mode at the end of the termination phase for each new user iteration. In at least some embodiments, the disclosed scripting application is able to emulate document object model (DOM) behavior based on recording and replaying a script on a single browser engine. Further, the disclosed scripting application may delegate javascript handling during a load test operation with a particular browser engine.

In at least some embodiments, the disclosed scripting application is stored by a computer-readable storage medium (e.g., computer-readable storage medium 105). Although not required, the computer-readable storage medium may be distributed as a portable memory (e.g., an optical disk or flash memory). Alternatively, the scripting application 114 is downloaded from a server for storage in a computer-readable medium of the computer system. When executed, the disclosed scripting application causes a processor to host an application on a browser engine with a privacy mode feature and to coordinate use of the privacy mode feature with emulation of user operations on the hosted application. In at least some embodiments, the emulated user operations may correspond to operations of a load testing scripter for new users. Further, the emulated user operations may correspond to a single new user iteration or a plurality of new user iterations on the hosted application. For each iteration, execution of the disclosed scripting application may cause a processor to start the privacy mode feature at the beginning of an initialization phase and to exit the privacy mode feature at the end of a termination phase for each new user iteration. In at least some embodiments, execution of the disclosed scripting application may cause a processor to emulate DOM behavior based on recording and replaying a script on a single browser engine. Further, execution of the disclosed scripting application may cause a processor to delegate javascript handling during a load test operation with a particular browser engine.

Figure 2:
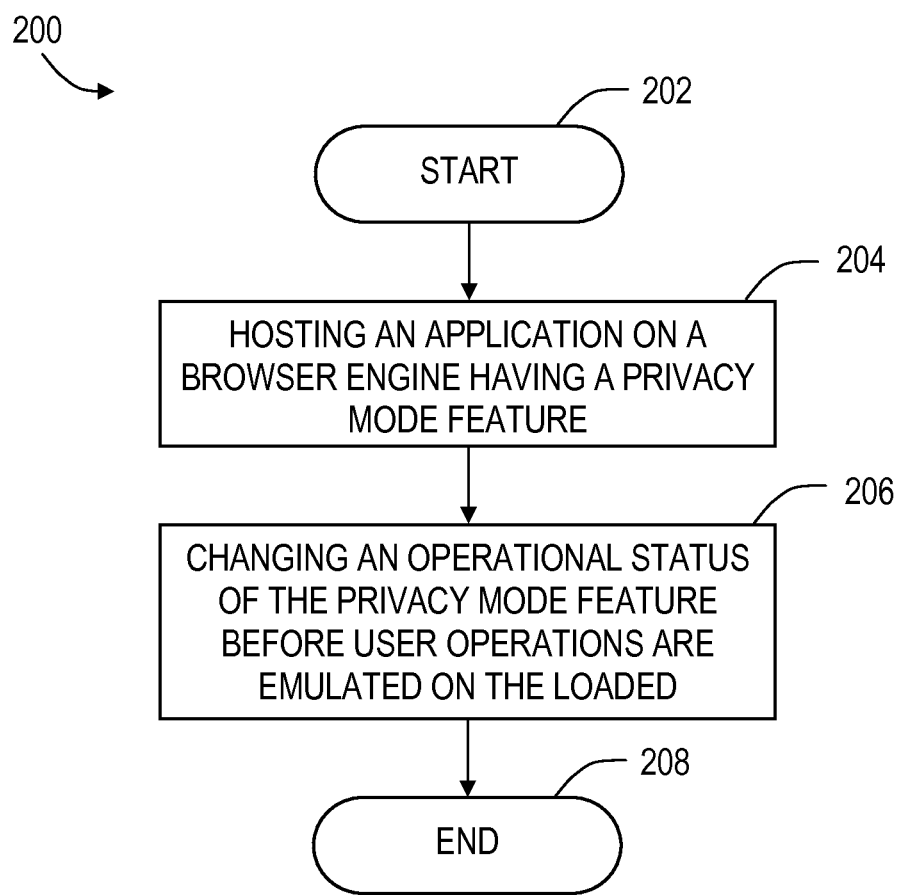
FIG. 2 shows a method for a script application in accordance with various embodiments.

FIG. 2 shows a method 200 for a scripting application in accordance with an embodiment of the disclosure. Though depicted sequentially as a matter of convenience, at least some of the actions shown can be performed in a different order and/or performed in parallel. Additionally, some embodiments may perform only some of the actions shown. In some embodiments, the operations of FIG. 2, as well as other operations described herein, can be implemented as instructions stored in a computer-readable medium (e.g., storage medium 105) and later read into a system memory (e.g., system memory 106) for execution by a processor (e.g., processor 104).

The method 200 starts at block 202 and continues to block 204 where an application is hosted on a browser engine having a privacy mode feature. At block 206 an operational status of the privacy mode feature is changed before user operations are emulated on the loaded application. The method 200 ends at block 208. In some embodiments, hosting the application is a part of a script sequence that includes user data, such as cookies or cached data. In such case, the privacy mode should be started before loading the application to ensure that this user data is stored in private data storage and is cleared for each new user iteration.

Figure 3:
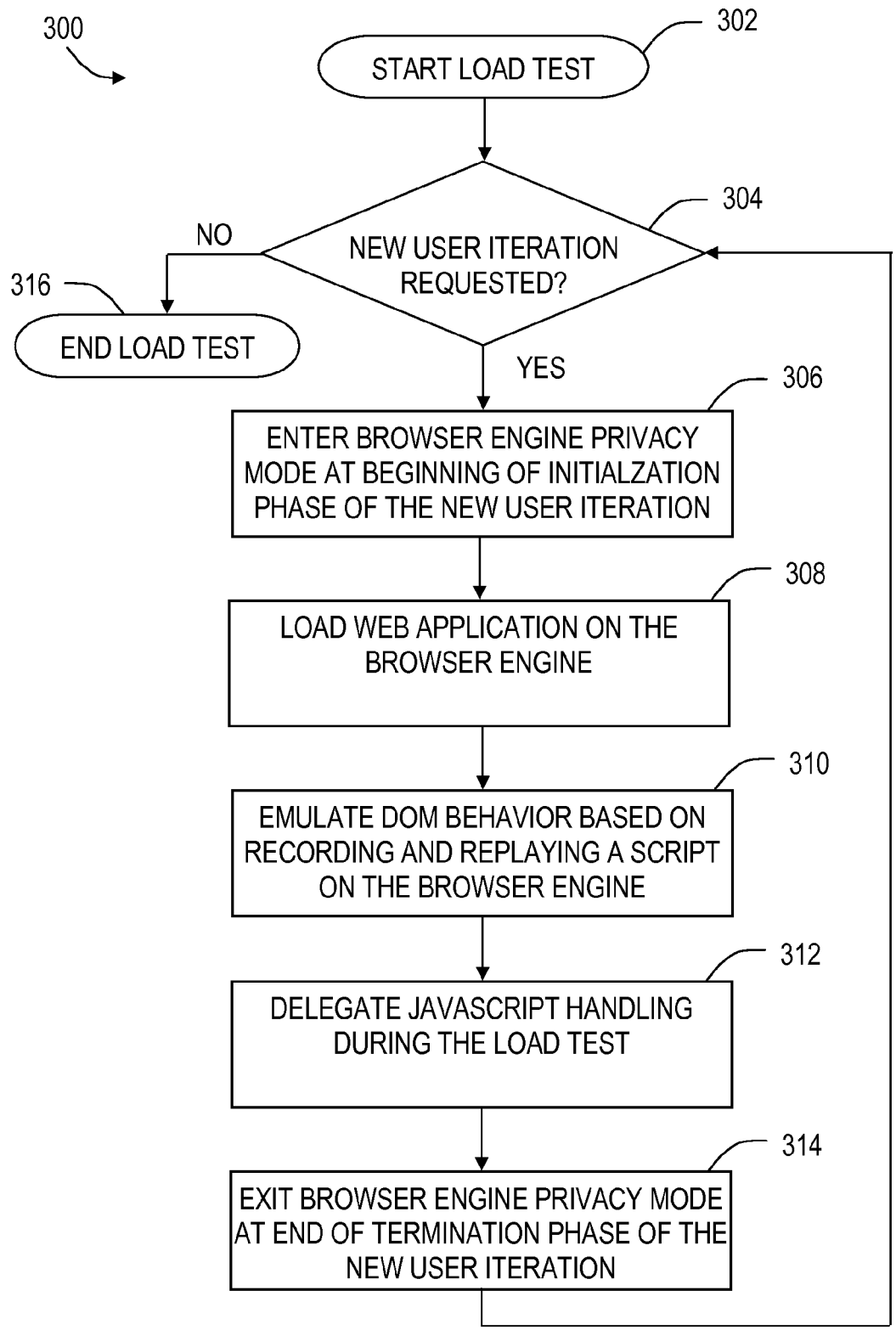
FIG. 3 shows a method for load testing in accordance with an embodiment of the disclosure.

FIG. 3 shows a method 300 for load testing in accordance with an embodiment of the disclosure. As shown, a load test is started at block 302 and comprises determining if a new user iteration is requested (determination block 304). If so, the method 300 enters a browser engine privacy mode at the beginning of an initialization phase of the new user iteration (block 306). At block 308, a web application is loaded on the browser engine. At block 310, DOM behavior is emulated based on recording and replaying a script on the browser engine. As shown, the method 300 also may comprise delegating Javascript handling during the load test (block 312). At the end of the termination phase of the new user iteration, the browser engine privacy mode is exited (block 314) and the method 300 returns to determination block 304. If a new user iteration is not requested (determination block 304), the load test ends (block 316) or moves on to other tests that do not involve new user iterations. Although the load test method 300 shows new user iterations are performed in series, it should be understood that a load test may additionally or alternatively perform new user iterations in parallel. The load test method 300 may correspond to operations of the scripting application disclosed herein.

The above discussion is meant to be illustrative of the principles and various embodiments of the present invention. Numerous variations and modifications will become apparent to those skilled in the art once the above disclosure is fully appreciated. For example, while script recording and automation of an application have been generally described by reference to a web application, those skilled in the art will understand that embodiments are applicable to a variety of different applications. It is intended that the following claims be interpreted to embrace all such variations and modifications.

What is claimed is:

1. A computer system, comprising:
a processor; and
a computer-readable storage medium coupled to the processor and storing a scripting application,
wherein the scripting application, when executed, is configured to coordinate use of a browser engine privacy mode with emulation of user operations on a browser-hosted application; and
wherein the emulation of user operations comprises simulation of a user's interaction with a browser-hosted application to test how the user operations effect the host application.

2. The computer system of claim 1 wherein the scripting application, when executed, is configured to coordinate use of the browser engine privacy mode during a load testing function that emulates user operations on the browser-hosted application.

3. The computer system of claim 1 wherein the scripting application, when executed, is configured to perform a plurality of load testing functions, where each load testing function is mapped to a different browser-hosted application and wherein each load testing function emulates user operations during a browser engine privacy mode.

4. The computer system of claim 1 wherein the scripting application, when executed, is configured to coordinate entering and exiting the browser engine privacy mode to emulate a plurality of new user iterations on the browser-hosted application.

5. The computer system of claim 4 wherein each new user iteration comprises an initialization phase, an activity phase, and a termination phase.

6. The computer system of claim 5 wherein the scripting application, when executed, is configured to enter the browser engine privacy mode at the beginning of the initialization phase and exit the browser engine privacy mode at the end of the termination phase for each new user iteration.

7. The computer system of claim 1 wherein the scripting application, when executed, is configured to emulate document object model (DOM) behavior based on recording and replaying a script on a single browser engine.

8. The computer system of claim 1 wherein the scripting application, when executed, is configured to delegate javascript handling during a load test operation with the browser engine related to the browser-hosted application.

9. A non-transitory computer-readable medium storing scripting application code that, when executed, causes a processor to:
host an application on a browser engine with a privacy mode feature;
coordinate use of the privacy mode feature while testing user operations on the hosted application while monitoring how the user operations effect the host application and storing monitoring data onto the computer-readable medium; and
wherein the privacy mode feature temporarily stores browsing data related to the browsing session and deletes the browsing data when exiting the privacy mode feature.

10. The computer-readable medium of claim 9 wherein execution of the scripting application code further causes the processor to perform a load testing scripter function that coordinates use of the privacy mode feature with emulation of user operations on the hosted application.

11. The computer-readable medium of claim 9 wherein execution of the scripting application code further causes the processor to coordinate use of the privacy mode feature with emulation of a plurality of new user iterations on the hosted application.

12. The computer-readable medium of claim 11 wherein each new user iteration comprises an initialization phase, an activity phase, and a termination phase and wherein execution of the scripting application code causes the processor to start the privacy mode feature at the beginning of the initialization phase and exit the privacy mode feature at the end of the termination phase for each new user iteration.

13. The computer-readable medium of claim 9 wherein execution of the scripting application code further causes the processor to emulate document object model (DOM) behavior based on recording and replaying a script on a single browser engine.

14. The computer-readable medium of claim 9 wherein execution of the scripting application code further causes the processor to delegate javascript handling during a load test operation with the browser engine.

15. A method for a scripting application, the method comprising:
loading, by a processor, an application on a browser engine having a privacy mode feature;
changing, by the processor, an operational status of the privacy mode feature before user operations are emulated on the hosted application; and
wherein the emulation of user operations comprises simulation of a user's interaction with a browser-hosted application to test how the user operations effect the host application.

16. The method of claim 15 further comprising performing a load testing operation that emulates a new user iteration on the loaded application based on the privacy mode feature.

17. The method of claim 15 further comprising emulating a plurality of new user iterations, where each new user iteration is mapped to a separate browser engine with a privacy mode feature, and managing the privacy mode feature for each separate browser engine.

18. The method of claim 17 wherein each new user iteration comprises an initialization phase, an activity phase, and a termination phase, and
wherein managing the privacy mode feature for each separate browser engine comprises starting the privacy mode feature at the beginning of the initialization phase and exiting the privacy mode feature at the end of the termination phase for each new user iteration.

19. The method of claim 15 further comprising determining if a new user iteration is requested and, if so, entering a browser engine privacy mode before said loading.

20. The method of claim 15 further comprising emulating document object model (DOM) behavior based on recording and replaying a script on a single browser engine.

* * * * *